United States Patent
Phillips et al.

(10) Patent No.: US 10,518,895 B2
(45) Date of Patent: Dec. 31, 2019

(54) FUEL TANK INERTING SYSTEM

(71) Applicant: HS Marston Aerospace Limited, Wolverhampton (GB)

(72) Inventors: Paul Phillips, Bromsgrove (GB); Berwyn Owain Pollard, Wolverhampton (GB)

(73) Assignee: HS MARSTON AEROSPACE LIMITED, Wolverhampton, Staffordshire (GB)

( * ) Notice: Subject to any disclaimer, the term of this patent is extended or adjusted under 35 U.S.C. 154(b) by 0 days.

(21) Appl. No.: 16/056,724

(22) Filed: Aug. 7, 2018

(65) Prior Publication Data
US 2019/0047722 A1 Feb. 14, 2019

(30) Foreign Application Priority Data

Aug. 9, 2017 (EP) ..................................... 17185619

(51) Int. Cl.
*B64D 37/32* (2006.01)
*B64D 37/04* (2006.01)

(52) U.S. Cl.
CPC ............. *B64D 37/32* (2013.01); *B64D 37/04* (2013.01)

(58) Field of Classification Search
CPC ............ B64D 37/32; B64D 37/04; A26C 3/12
USPC ........................................................ 422/198
See application file for complete search history.

(56) References Cited

U.S. PATENT DOCUMENTS

| | | | |
|---|---|---|---|
| 2,937,506 A * | 5/1960 | Stirlen | B64D 13/08 261/122.1 |
| 3,164,955 A * | 1/1965 | Garraway | F01K 23/06 60/206 |
| 3,847,298 A | 11/1974 | Hamilton | |
| 7,694,916 B2 | 4/2010 | Limaye et al. | |
| 7,896,292 B2 | 3/2011 | Limaye et al. | |
| 7,905,259 B2 | 3/2011 | Johnson et al. | |
| 8,602,362 B2 | 12/2013 | Buchwald | |
| 8,828,344 B2 | 9/2014 | K-Wlam et al. | |
| 9,144,768 B2 | 9/2015 | Tichborne et al. | |
| 2008/0128048 A1 | 6/2008 | Johnson | |
| 2012/0279395 A1 | 11/2012 | K-Wlam et al. | |
| 2013/0000142 A1 | 1/2013 | Tichborne et al. | |
| 2015/0321924 A1* | 11/2015 | Wrubel | C02F 1/22 62/532 |
| 2017/0057641 A1* | 3/2017 | Koerner | B64D 13/06 |

FOREIGN PATENT DOCUMENTS

GB 1395691 A 5/1975

OTHER PUBLICATIONS

Extended European Search Report for International Application No. 17185619.8 dated Jan. 16, 2018, 7 pages.

* cited by examiner

*Primary Examiner* — Huy Tram Nguyen
(74) *Attorney, Agent, or Firm* — Cantor Colburn LLP

(57) ABSTRACT

There is provided a fuel tank inerting system for an aircraft which comprises a catalytic heat exchanger. The catalytic heat exchanger comprises a first flow path and a second flow path for heat exchange with the first flow path. The system also comprises a refrigerant circuit comprising at least the second flow path so that during use refrigerant in the refrigerant circuit is in heat exchange with the first flow path.

14 Claims, 1 Drawing Sheet

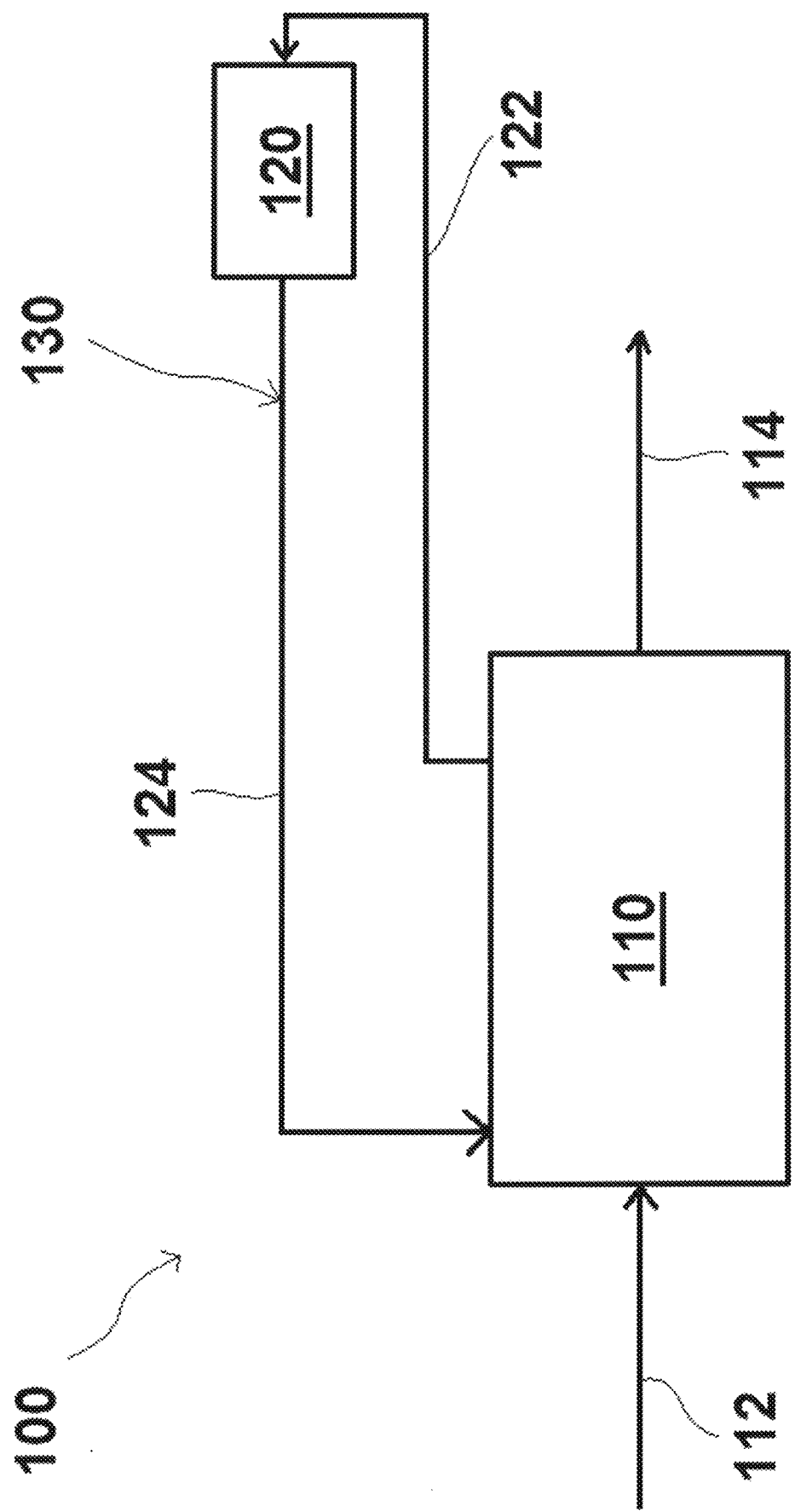

FUEL TANK INERTING SYSTEM

FOREIGN PRIORITY

This application claims priority to European Patent Application No. 17185619.8 filed Aug. 9, 2017, the entire contents of which is incorporated herein by reference.

TECHNICAL FIELD

The invention relates to a fuel tank inerting system for an aircraft, particularly to a fuel tank inerting system comprising a catalytic heat exchanger.

BACKGROUND

Fuel tank inerting systems (also called flammability reduction systems) are used on most commercial aircraft. They are used to provide an inert atmosphere to the ullage or header of a fuel tank in order to reduce the risk of fuel combustion and explosion.

Typically they employ air separation membrane technology. However, such known systems degrade over time and require significant levels of costly maintenance. An alternative system is a catalyst based fuel tank inerting system, where bleed-air-fed air separation modules and filter elements are replaced by a catalyst. Such a system requires fuel vapour to be mixed with oxygen and passed through a catalyst device to be converted into carbon dioxide ($CO_2$) and water ($H_2O$). Due to significant temperatures that are generated during the catalyst's exothermic reaction the catalyst needs to be cooled. Hence the catalyst may be provided as a coating inside a heat exchanger. The heat exchanger may be cooled by e.g. ram air.

However, in use such heat exchangers face issues because different amounts of cooling are available during different stages of flight. For example, operating conditions on the ground are different to those at cruise. Ram air at cruise can have a temperature of −40° F. (−40° C.), whereas on the ground in hot climates it can have a temperature as much as +130° F. (50° C.). The catalysed reaction of fuel and oxygen in the heat exchanger must be kept at a minimum of 350° F. (180° C.) in order to keep the catalyst 'lit' (i.e. reacting) and the catalysed reaction active. A heat exchanger sized so that it achieves a maximum temperature of 425° F. (220° C.) on the ground will produce warmed ram air of 1600° F. (870° C.) during cruise, far in excess of the necessary temperatures. Making a heat exchanger small in order to avoid such high cruise temperatures results in too high ground temperatures. Thus, it is necessary to compromise and use a heat exchanger that is non-optimal for all conditions.

SUMMARY

According to a first aspect of the present invention there is provided a fuel tank inerting system for an aircraft comprising: a catalytic heat exchanger comprising a first flow path and a second flow path for heat exchange with the first flow path; and a refrigerant circuit comprising at least the second flow path so that during use refrigerant in the refrigerant circuit is in heat exchange with the first flow path.

During use the first flow path of the catalytic heat exchanger is supplied with fuel vapour and oxygen, and a reaction takes place in the first flow path of the catalytic heat exchanger, catalysed by a catalyst in the first flow path. The reaction generates carbon dioxide and water, which may be then be used to create an inert atmosphere for an ullage of a fuel tank.

The refrigerant circuit includes the second flow path of the catalytic heat exchanger and therefore refrigerant in the refrigerant circuit passes into heat exchange relationship with the first flow path. The catalysed reaction in the first flow path generates heat and refrigerant in the refrigerant circuit cools the first flow path and the catalysed reaction therein. The refrigerant may cool the first flow path by evaporating to form refrigerant vapour. The refrigerant circuit may comprise any suitable components.

The refrigerant circuit may comprise a heat sink or condenser arranged to cool refrigerant in the refrigerant circuit during use. Hot refrigerant may then be cooled and the heat carried thereby transferred out of the fuel inerting system.

The fuel inerting system may comprise a fuel tank and the heat sink may be arranged to heat the fuel tank. The system may thereby be arranged to heat fuel in the fuel tank and help prevent fuel icing problems.

The heat sink may be arranged to evaporate liquid fuel, and the fuel inerting system may be arranged to supply the evaporated fuel to the first flow path during use. The refrigerant cycle may therefore be used to improve efficiency of the fuel inerting system by using heat from the catalytic reaction to generate the fuel vapour needed to sustain the catalytic reaction.

The heat sink may be arranged to transfer heat to an airstream for use in a conditioning system, such as for an aircraft cabin.

The refrigerant circuit may be arranged to supply liquid refrigerant to the second flow path of the catalytic heat exchanger. Liquid refrigerant can absorb greater amounts of heat than e.g. refrigerant vapour, since it may change phase into a vapour and absorb heat thereby, making use of the latent heat of vaporisation. The refrigerant circuit may be arranged to cool the first flow path of the catalytic heat exchanger by evaporation of refrigerant in the second flow path.

Hence the refrigerant circuit may be arranged to supply refrigerant vapour from the second flow path to the heat sink. The heat sink may be arranged to condense the refrigerant vapour to a liquid, ready for supply to the second flow path of the catalytic heat exchanger again.

The fuel tank inerting system may comprise a control valve arranged to provide control over the rate of cooling of the first flow path of the catalytic heat exchanger. The control valve may be disposed in the refrigerant circuit and may control the amount of refrigerant which passes through the heat exchanger, thereby regulating the cooling. The control valve may be a bypass valve.

The refrigerant circuit may contain ammonia, and hence may be toxic. The use of refrigerants in an aircraft is not typically desirable because refrigerants can leak from their circuits by virtue of the small size of their molecules. Hence, many materials are effectively porous to refrigerants. Therefore, the use of refrigerant circuits in sealed environments like aircraft can be particularly problematic, since passengers may breathe in toxic substances.

The invention may comprise an aircraft including a fuel inerting system as described above, and a passenger compartment, wherein the fuel inerting system is isolated from the passenger compartment. The passenger compartment may be sealed and enclosed and therefore leakage of refrigerants into the compartment is undesirable. By isolating the fuel inerting system from the passenger compartment, leakage of refrigerants will not adversely affect passengers. For example, the fuel inerting system may be located in a wing of the aircraft.

The refrigerant circuit may contain R134a (an ozone-safe refrigerant), R136fa (a hydrofluorocarbon (HFC) refrigerant), R124 (a hydrochlorofluorocarbon (HCFC) refrigerant), and/or R12. The refrigerant circuit may contain any suitable refrigerant.

According to a second aspect of the present invention there is provided a method of cooling a catalytic heat exchanger of a fuel inerting system comprising a catalytic heat exchanger comprising a first flow path and a second flow path for heat exchange with the first flow path; and a refrigerant circuit comprising at least the second flow path; the method comprising evaporating liquid refrigerant to form refrigerant vapour in the second flow path so as to cool the first flow path; and condensing the refrigerant vapour outside the second flow path of the catalytic heat exchanger by cooling the refrigerant vapour.

Cooling the refrigerant vapour may comprise heating liquid fuel in a fuel tank. Therefore the method may include warming liquid fuel in a fuel tank using the heat generated by the catalysed reaction in the catalytic heat exchanger, thereby reducing the risk of fuel icing problems.

Cooling the refrigerant vapour may comprise evaporating liquid fuel to form fuel vapour, and may further comprise supplying the fuel vapour to the first flow path of the catalytic heat exchanger. Thus the efficiency of the fuel inerting system may be improved by using heat generated from the catalysed reaction to create the fuel vapour needed for sustaining the reaction.

The method may comprise supplying the condensed refrigerant vapour to the second flow path for cooling the first flow path. The refrigerant therefore may be used repeatedly in cooling the catalysed reaction.

The method may comprise using a control valve and/or a bypass valve to control the rate of cooling of the catalytic heat exchanger. The method may comprise using a control valve to regulate the flow of refrigerant through the heat exchanger in order to control the cooling effect thereof.

The method may comprise using the fuel inerting system as described above in relation to the first aspect.

BRIEF DESCRIPTION OF THE DRAWINGS

An embodiment of the invention is described below by way of example only and with reference to the accompanying drawing in which:

FIG. 1 shows a fuel inerting system comprising a catalytic heat exchanger and a refrigerant circuit.

DETAILED DESCRIPTION

FIG. 1 shows a fuel inerting system 100 comprising a catalytic heat exchanger 110 with a first flow path between a line 112 and a line 114, and a second flow path between a line 124 and a line 122. The first and second flow paths are in a heat exchanging arrangement with each other. The system 100 also includes a refrigerant circuit 130 comprising the second flow path, the line 122, a heat sink 120, and the line 124.

The line 112 supplies fuel vapour and oxygen to the first flow path of the heat exchanger 110. The first flow path of the heat exchanger contains a catalyst, which catalyses a reaction between the fuel vapour and oxygen entering the first flow path. The reaction generates carbon dioxide and water, which then leaves the first flow path via the line 114.

The mixture of water and carbon dioxide may be separated and the carbon dioxide provided to a fuel tank (not shown) to create an inert atmosphere therein.

The catalysed reaction generates heat and requires cooling. Refrigerant in the refrigerant circuit 130 enters the second flow path from the line 124 and passes into heat exchange with the reaction in the first flow path. The refrigerant in line 124 is in a liquid phase, but upon absorbing heat from the catalysed reaction is evaporated into a vapour. The hot refrigerant vapour leaves the second flow path via the line 122 and is supplied to the heat sink 120.

The heat sink 120 cools the refrigerant causing the vapour to condense into a liquid. The liquid refrigerant then passes from the heat sink 120 to the second flow path for cooling the reaction again.

The heat rejected from the refrigerant in the heat sink 120 may be used for another suitable purpose. For example, it may heat liquid fuel in a fuel tank to reduce fuel icing problems, and/or may be used to vapourise fuel for supply to the first flow path via the line 112. The refrigerant circuit 130 may therefore be used to improve the efficiency of the fuel inerting system.

The system and method described herein and shown in the drawing provides a fuel inerting system and method for an aircraft which allows sufficient cooling at all stages of flight. Moreover, it improves the efficiency of existing fuel inerting systems by usefully employing heat generated by the catalysed reactions.

The invention claimed is:

1. A fuel tank inerting system for an aircraft comprising:
    a catalytic heat exchanger comprising a first flow path and a second flow path for heat exchange with the first flow path; and
    a refrigerant circuit comprising at least the second flow path so that during use refrigerant in the refrigerant circuit is in heat exchange with the first flow path.

2. A fuel tank inerting system as claimed in claim 1, wherein the refrigerant circuit comprises a heat sink arranged to cool refrigerant in the refrigerant circuit during use.

3. A fuel tank inerting system as claimed in claim 2, comprising a fuel tank, wherein the heat sink is arranged to heat the fuel tank during use.

4. A fuel tank inerting system as claimed in claim 2, wherein the heat sink is arranged to evaporate liquid fuel, and the system is arranged to supply the evaporated fuel to the first flow path during use.

5. A fuel tank inerting system as claimed in claim 1, wherein the refrigerant circuit is arranged to supply liquid refrigerant to the second flow path of the catalytic heat exchanger.

6. A fuel tank inerting system as claimed in claim 1, wherein the refrigerant circuit is arranged to cool the first flow path of the catalytic heat exchanger by evaporation of refrigerant in the second flow path.

7. A fuel tank inerting system as claimed in claim 1, comprising a control valve arranged to provide control over the rate of cooling of the first flow path of the catalytic heat exchanger.

8. A fuel tank inerting system as claimed in claim 1, wherein the refrigerant circuit contains ammonia.

9. An aircraft comprising:
    a fuel inerting as claimed in claim 1; and
    a passenger compartment;
    wherein the fuel inerting system is isolated from the passenger compartment.

10. A method of cooling a catalytic heat exchanger of a fuel inerting system comprising a catalytic heat exchanger comprising a first flow path and a second flow path for heat exchange with the first flow path; and a refrigerant circuit comprising at least the second flow path, the method comprising evaporating liquid refrigerant to form refrigerant vapour in the second flow path so as to cool the first flow path; and condensing the refrigerant vapour outside the second flow path of the catalytic heat exchanger by cooling the refrigerant vapour.

11. A method as claimed in claim 10, wherein cooling the refrigerant vapour comprises heating liquid fuel in a fuel tank.

12. A method as claimed in claim 10, wherein cooling the refrigerant vapour comprises evaporating liquid fuel to form fuel vapour, the method further comprising supplying the fuel vapour to the first flow path of the catalytic heat exchanger.

13. A method as claimed in claim 10, comprising supplying the condensed refrigerant vapour to the second flow path for cooling the first flow path.

14. A method as claimed in claim 10, comprising using a control valve to control the rate of cooling of the catalytic heat exchanger.

* * * * *